US 6,577,753 B2

(12) United States Patent
Ogawa

(10) Patent No.: US 6,577,753 B2
(45) Date of Patent: *Jun. 10, 2003

(54) MEDICAL NETWORK SYSTEM

(75) Inventor: Eiji Ogawa, Kanagawa-ken (JP)

(73) Assignee: Fuji Photo Film Co., Ltd., Kanagawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/280,857

(22) Filed: Mar. 30, 1999

(65) Prior Publication Data

US 2002/0003893 A1 Jan. 10, 2002

(30) Foreign Application Priority Data

Mar. 31, 1998 (JP) .............................. 10-087142

(51) Int. Cl.[7] .............................. G06K 9/00; G06K 9/40; G06F 12/00
(52) U.S. Cl. ..................... 382/132; 382/128; 382/255; 707/201
(58) Field of Search ................................. 382/132, 131, 382/167, 274, 162, 309, 100; 128/922; 707/1, 103; 345/835

(56) References Cited

U.S. PATENT DOCUMENTS

| | | | | |
|---|---|---|---|---|
| 4,794,460 A | * | 12/1988 | Shiota | 358/244 |
| 5,005,126 A | * | 4/1991 | Haskin | 364/413.13 |
| 5,115,229 A | * | 5/1992 | Shalit | 340/716 |
| 5,345,315 A | * | 9/1994 | Shalit | 358/406 |
| 5,384,643 A | * | 1/1995 | Inga et al. | 358/403 |
| 5,461,493 A | * | 10/1995 | Venable | 358/520 |
| 5,469,353 A | * | 11/1995 | Pinsky et al. | 364/413.01 |
| 5,671,070 A | * | 9/1997 | Przybylowicz et al. | 358/487 |
| 5,694,224 A | * | 12/1997 | Tai | 358/455 |
| 5,706,070 A | * | 1/1998 | Reich et al. | 351/201 |
| 6,014,452 A | * | 11/2000 | Zhang et al. | 382/132 |
| 6,323,869 B1 | * | 11/2001 | Kohm et al. | 345/581 |

FOREIGN PATENT DOCUMENTS

| JP | 62-18536 | 1/1987 | ............ G03B/42/02 |
|---|---|---|---|

* cited by examiner

Primary Examiner—Jayanti K. Patel
Assistant Examiner—Yosef Kassa
(74) Attorney, Agent, or Firm—Sughrue Mion, PLLC

(57) ABSTRACT

In a medical network system, the tone of an image displayed on a commonly-used image display apparatus becomes a desired tone corresponding to the type of an image outputting apparatus. Look-up tables correcting image information in accordance with each image outputting apparatus are pre-stored in tone correction look-up tables so that the tone of the displayed image based on the image information obtained by the image information outputting apparatus becomes desirable corresponding to each apparatus. Selection means reads the type of the image information outputting apparatus from information accompanying the image information and inputs the read information to the tone correction look-up table. The tone correction look-up table changes a signal level of the image information for each of the RGB signals by using an LUT selected by the selection means and inputs the image information after the change to image display means.

24 Claims, 2 Drawing Sheets

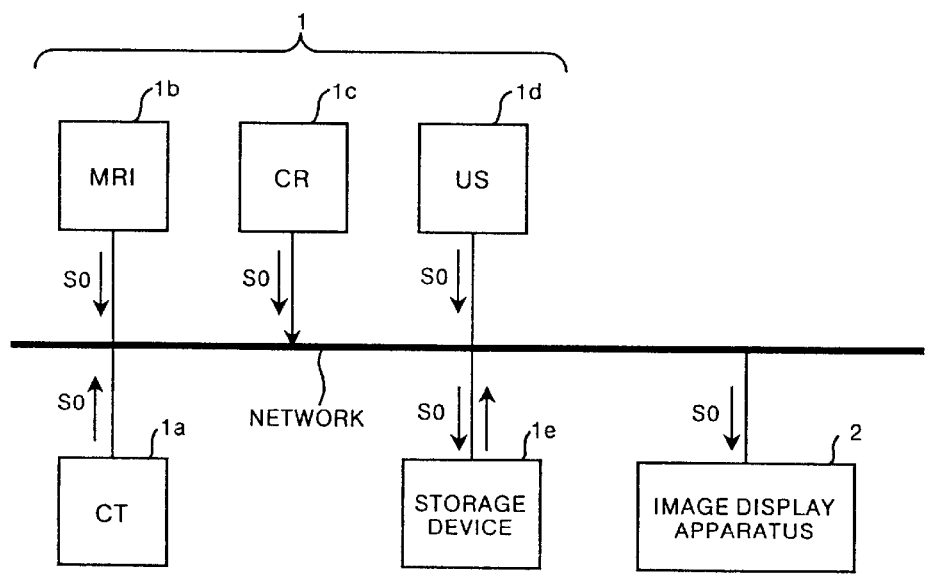
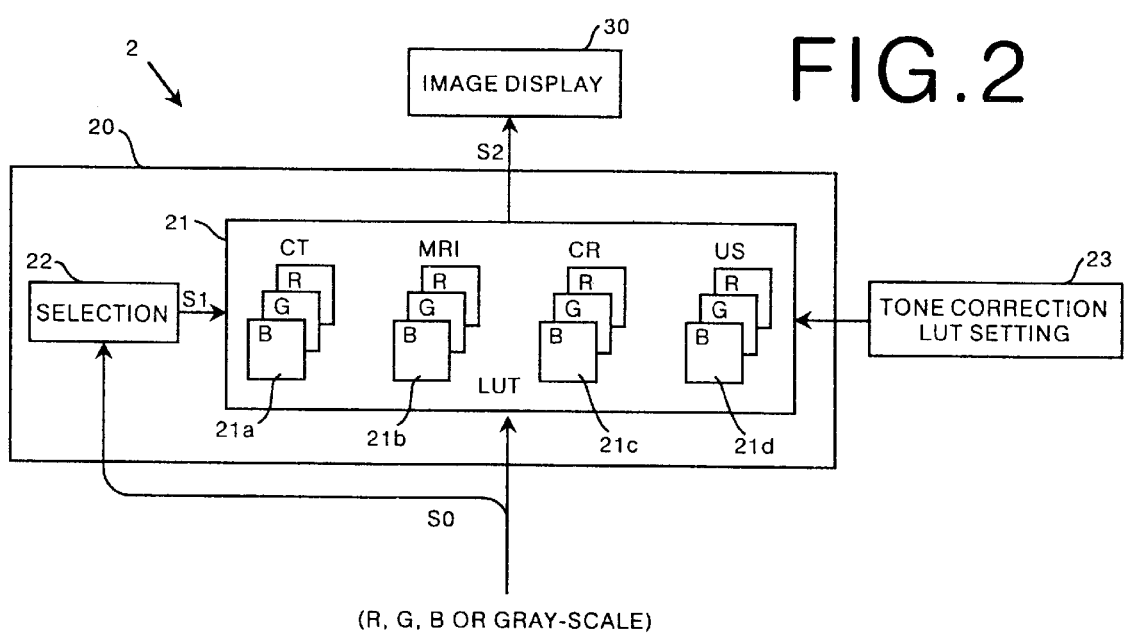

FIG.3
(A) TONE EXAMPLE : CT(BLUISH)
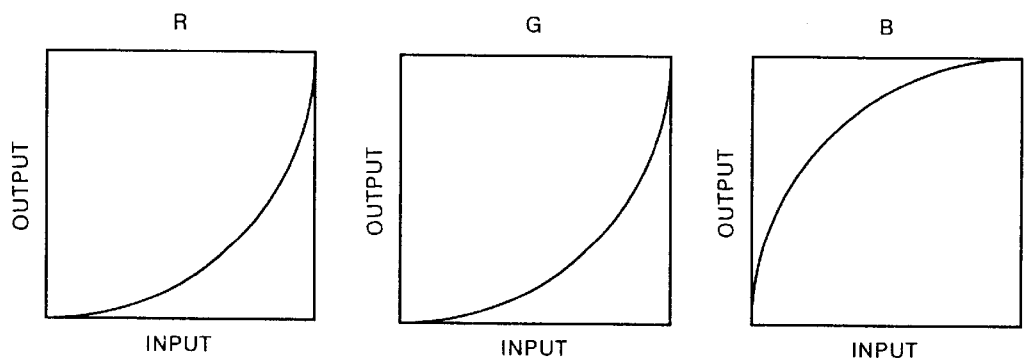
(B) TONE EXAMPLE : MRI(GREENISH)
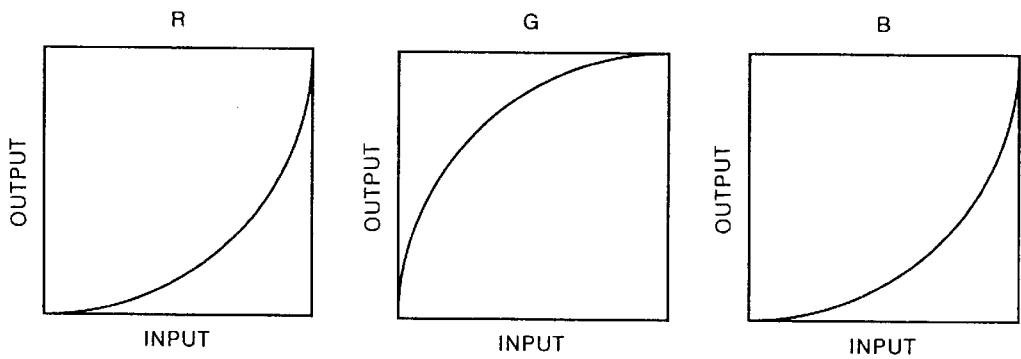

MEDICAL NETWORK SYSTEM

BACKGROUND OF THE INVENTION

1. Field of the Invention

The present invention relates to a medical network system wherein a medical image information outputting apparatus and an image display apparatus are connected to a network, and more specifically, to a medical network system which enables color display of a visual image such that a tone of a displayed image becomes a desirable tone corresponding to the type of medical image information.

2. Description of the Related Art

In the field of medicine, various types of diagnostic image acquiring apparatuses using X rays or the like are being used. X-ray photographing apparatuses, RI apparatuses, CR (Computed Radiography) apparatuses, CT (Computed Tomography) apparatuses, US (Ultrasonography) apparatuses, and MRI (Magnetic Resonance Imaging) apparatuses have been put into practice, for example.

Image information acquired by these apparatuses are converted into a TV image signal according to the NTSC method or the like after desired image processing such as frequency processing or tone processing has been carried out thereon. The image signal is then displayed as a visual image on an image display apparatus such as a CRT display, an LCD or an organic EL display, to be used in a medical facility for diagnosing a lesion, injury and the like and the degree thereof.

A CR apparatus means a radiation image recording reading apparatus for recording radiation image information of a subject such as a human body on a stimulable phosphor sheet which emits light upon exposure to a stimulating ray such as visible light and infrared light in accordance with radiation energy stored thereon due to radiation irradiated thereon and for acquiring an image signal by photoelectrically reading the emitted light while scanning the stimulable phosphor sheet with the stimulating ray. Recently, CR apparatuses have been widely spread and put into practice (see Japanese Unexamined Patent Publication No. 62(1987)-18536, for example).

A medical network system wherein a diagnostic workstation comprising the above-described image display apparatus or the like and various types of image acquiring apparatuses are networked has also been proposed so that medical doctors can diagnose at a location remote from the image acquiring apparatuses.

Since images to be displayed are mixture of monochrome images, such as CT images, and colored images, such as MRI images, an image display apparatus enabling color display is used as a component of the diagnostic workstation and an image to be displayed in monochrome is usually displayed on the image display apparatus by input of its image signal into the RGB input of the display apparatus.

A medical image obtained by any image acquiring apparatus such as the CR apparatus described above is often viewed in a preferred tone depending on the image acquiring apparatus, by being displayed on an image display in a console of the image acquiring apparatus or by being output from a printer of the image acquiring apparatus. Consequently, tones of the displayed images are different depending on each image acquiring apparatus, regardless of the fact that they are all gray-scale images.

Therefore, in the case where a network is configured and one image display apparatus is commonly used as the image display apparatus for each of the image acquiring apparatuses, the tone needs to be changed in accordance with the type of image information input to the display apparatus, in order to maintain the environment of viewing in the same tone as on the display apparatus operated by the console of each image acquiring apparatus.

However, when a network is configured, there is a wide variety of image acquiring apparatuses and the tone is different in some cases, even for the same type of image acquiring apparatuses, depending on manufacturers, production lots, or models. Furthermore, different portions of a subject may be displayed in different tones. Therefore, it is necessary to change the tone setting so as to cause the displayed image to have a desired tone. However, there is also a wide variety of input image information and it is troublesome for an operator to change the setting every time so that the tone of the displayed image becomes desirable depending on the type of image information.

SUMMARY OF THE INVENTION

The present invention has been conceived based on consideration of the above problems. An object of the present invention is to provide a medical network system which can easily change the tone of an image to be displayed to a desired one corresponding to the type of image information according to image information outputting apparatus and a photographed portion of a subject, even when a common image display apparatus is used in the medical network system.

In a medical network system of the present invention where medical image information outputting apparatuses and an image display apparatus shared for displaying image information output from the medical image information outputting apparatuses as visual images are networked, the image display apparatus comprises:

image display means such as a CRT display, an LCD, or an organic EL display for displaying the visual image in color; and tone correcting means for correcting the image information so that the tone of the visual image becomes a desired tone corresponding to the type of image information and for inputting the corrected image information to the image display means.

The "medical image information outputting apparatuses" herein referred to mean apparatuses which output medical image information to the image display apparatus. A typical medical image information outputting apparatus is an image acquiring apparatus such as the CR apparatus described above. However, the medical image information outputting apparatuses are not limited to those described above. For example, in the case where image information acquired by a CR apparatus or the like is stored in a storage device using a recording medium such as an optical disc and the image information is output from the storage device to the image display apparatus upon display of an image, the storage device serves as the medical image information outputting apparatus.

"The type of image information" determines the tone of an image to be displayed on the image display means according to the content of the image information, such as the type of medical image information outputting apparatus having output the image information or the type of a photographed body portion. "The type of medical image information outputting apparatus" includes not only the type of apparatus such as a CR apparatus or an MRI apparatus but also a classification such that a difference in manufacturers, product lots or models for the same type of image information outputting apparatus is distinguished thereby, for example.

The "desired tone corresponding to the type of image information" means the tone determined by the content of the image information and can be set arbitrarily according to a preference of a viewer. The setting can be carried out in detail by specifying chromaticity coordinates (such as X, Y, Z coordinates or L*, a, b coordinates) by using tone correction look-up table changing means, for example.

"The image display means" can be any means as long as it can display visual images in color. The image display means may be a soft copy displaying apparatus such as the CRT display, the LCD, and the organic EL display described above, or a hard copy outputting apparatus such as an LP (Laser Printer).

It is preferable for tone correcting means of the image display apparatus in this system to comprise a plurality of tone correction look-up tables for correcting the image information according to the type of image information and selection means for selecting the tone correction look-up table corresponding to the type of input image information. In this manner, the tone correcting means can correct the image information by using the tone correction look-up table selected by the selection means.

Furthermore, if the image information includes information indicating its type as accompanying information and the selection means selects the tone correction look-up table based on the accompanying information, the look-up table can be selected automatically by reading the type from the accompanying information.

To "select the tone correction look-up table based on the accompanying information" means to identify the image information outputting apparatus having the image information or the type of the image to be output, by reading the type of the image information from the information accompanying the image information and to select the tone correction look-up table corresponding to the identified type of the image information.

Furthermore, a medical network connecting method of the present invention is a method of connecting, to a medical network, medical image information outputting apparatuses and an image display apparatus shared for displaying image information output from the medical image information outputting apparatuses as visual images in color, and the image information is input to the image display apparatus after being corrected so that the tone of the visual image becomes a desired tone corresponding to the type of image information.

According to the medical network system of the present invention, image information is corrected so that the tone of the image to be displayed on the image display apparatus becomes desirable corresponding to the type of image information. Therefore, even when the tone of the images to be displayed varies corresponding to the type of image information, as in the tone difference between images obtained by a CR apparatus and an MRI apparatus, the tone can be corrected to a desired one corresponding to the type of image information.

Furthermore, if the look-up tables are used for correction of the image information, the correction can be carried out easily. Moreover, if the type of the image information is read from the accompanying information, the correction can be carried out automatically.

BRIEF DESCRIPTION OF THE DRAWINGS

FIG. 1 shows a configuration of a medical network system as an embodiment of the present invention;

FIG. 2 is a block diagram showing in detail an image display apparatus composing the medical network system; and FIGS. 3(A) and 3(B) are diagrams showing examples of tones in tone correction look-up tables composing the image display apparatus.

DESCRIPTION OF THE PREFERRED EMBODIMENT

Hereinafter, an embodiment of the present invention will be explained with reference to the accompanying drawings. FIG. 1 shows a configuration of a medical network system as an embodiment of the present invention. FIG. 2 is a block diagram showing in detail an image display apparatus 2 composing the medical network system.

As shown in FIG. 1, as image information outputting apparatuses 1, medical image acquiring apparatuses such as a CT apparatus 1a, an MRI apparatus 1b, a CR apparatus 1c, and a US apparatus 1d, and a storage device 1e for temporarily storing in an optical disc or the like image information output from the medical image information outputting apparatuses are connected to a network. Image information S0 input from each apparatus is input to the image display apparatus 2 and displayed as a visual image thereby. The image information S0 is composed of gray scale signals or RGB color signals, and comprises accompanying information S1 indicating the type of the image information. In this example, the type of the image information means the type (1a–1d) of the image information outputting apparatuses 1, such as the CT apparatus 1a and the MRI apparatus 1b.

As shown in detail in FIG. 2, the image display apparatus 2 comprises tone correcting means 20 for correcting each of the RGB color signals of the image information S0 so that the image to be displayed has a desired tone corresponding to each of the image information outputting apparatuses 1, image display means 30 for displaying in color a visual image based on image information S2 corrected by the tone correcting means 20, and tone correction look-up table setting means 23 for setting a look-up table (LUT) in tone correction look-up tables 21 which will be described later and for changing a combination of the LUT and the type (1a–1d) of the image information outputting apparatuses 1. The image display means 30 can be a CRT display, an LCD, an organic EL display or any other means as long as color display of an image is possible.

The tone correcting means 20 comprises the LUT's 21 which change an input/output characteristic of a signal level, and the selection means 22 for identifying which apparatus has output the image information by reading the type (1a–1d) of the apparatus from the information accompanying the image information S0 and for selecting one of the LUT's corresponding to the identified image information outputting apparatus.

The tone correction LUT 21's include an LUT 21a for CT, an LUT 21b for MRI, an LUT 21c for CR, and an LUT 21d for US so that each of the LUT's for the 3 primary colors described above corresponds to the type (1a–1d) of the image information outputting apparatuses 1. The LUT's 21a–21d change the signal level of the image information S0 input to the tone correcting means 20 so that the tone of the image to be displayed becomes desirable corresponding to each of the apparatuses 1a–1d, and input the image information S0 to the image display means 30. The LUT's 21 are set by an instruction from the tone correction LUT setting means 23. The combination of the type (1a–1d) of the apparatuses 1 and each of the LUT's newly set in this manner can also be changed by an instruction from the tone correction LUT setting means 23.

FIG. 3 shows examples of output tone characteristics. For example, for the CT apparatus 1a, as shown in FIG. 3(A), the tone characteristic of B is upwardly convex compared to that of R and G and the tone of the displayed image becomes bluish. For the MRI apparatus 1b, as shown in FIG. 3(B), the tone characteristic of G is upwardly convex compared to that of R and B and the tone of the displayed image becomes greenish.

The tone correcting means 20 inputs the information S1 indicating the type of the image information outputting apparatus to the tone correction LUT's 21 after the selection means 22 has identified the type of the apparatus from the accompanying information of the image information S0. The tone correcting means 20 then selects the LUT corresponding to the information S1 from the LUT's 21a–21d, and changes the signal level of the image information S0 by using the selected LUT.

Hereinafter, an operation of the image display apparatus 2 in the above configuration will be explained in detail.

The image display apparatus 2 receives the image information S0 from any one of the image information outputting apparatuses 1 (1a–1d) and inputs the image information S0 to the LUT's 21 and the selection means 22 of the tone correcting means 20.

The selection means 22 identifies which of the image information outputting apparatuses 1 has output the image information S0 by reading the type (1a–1d) of the apparatus from the accompanying information of the image information S0, and inputs the information S1 indicating the type of the identified apparatus to the LUT's 21.

The LUT's 21 select the LUT corresponding to the information S1 out of the pre-stored LUT's 21a–21d, and change each of the RGB signal levels of the image information S0 by using the selected LUT. In this manner, when the image information S0 has been obtained by the CT apparatus 1a, the LUT 21a is used for example, and the output tone characteristic of the output image signal S2 is changed in such a manner that the tone characteristic of B is upwardly convex compared to that of R and G, as shown in FIG. 3(A). When the image information S0 has been obtained by the MRI apparatus 1b, the LUT 21b is used, and the output tone characteristic of the output image signal S2 is changed so that the tone characteristic of G is upwardly convex compared to that of R and B, as shown in FIG. 3(B).

In this manner, the image signal S2 corrected in accordance with the type of the image information S0 (in this example, the type 1a–1d of the image information outputting apparatuses 1) can be input to the image display means 30, and a visual image in a desired tone corresponding to the type of image information S0 can be displayed automatically.

In the above description, an example using the type (1a–1d) of the image information outputting apparatuses 1, such as the CT apparatus 1a or the MRI apparatus 1b, as the type of image information S0 has been explained. However, the present invention is not limited to the above example and any information can be used as long as the tone of the displayed image can be determined by the content of the image information. For example, in the case where the same type of CT apparatuses are used although the manufacturers thereof are different, or in the case where the tone of the displayed image is determined by a product lot or a model even when the manufacturer is the same, the classification distinguishing these differences can be used as the type of the image information. Alternatively, the kind of the photographed body portion or the like may be used as the type of image information rather than the type of the image information outputting apparatus.

Furthermore, in the above example, the case where the type of image information outputting apparatus is identified by the accompanying information of the image information S0 upon selection of the tone correction look-up table by the selection means 22 has been explained. However, the present invention is not limited to the above example. An operator can input the type of image information by using a keyboard after judging the type of input image information, for example. In this case, the operator only has to carry out input of the type, which is a very simple operation.

The image display apparatus to be used in the system of the present invention is not limited to the one which can change the signal level by using the tone correction look-up table corresponding to the type of image information. Any method can be adopted as long as the image signal input to the image display means is corrected in such a manner that the tone of the image to be displayed by the image display means becomes a desired one corresponding to the type of image information. For example, the signal level of the input image information can be changed by using a predetermined conversion function.

What is claimed is:

1. A medical network system, wherein (a) a type of medical information that comprises a type of medical image information outputting apparatus and/or a type of photographed body portion, and (b) an image display apparatus shared for displaying image information output from the medical image information outputting apparatuses as visual images, are networked, the image display apparatus comprising:

image display means for displaying the visual image in color; and a tone correcting means for correcting the image information so that the tone of the visual image becomes a desired tone corresponding to said type of medical image information outputting apparatus and/or said type of photographed body portion, and for inputting the corrected image information to the image display means; said tone correcting means comprising a plurality of tone correction look-up tables and selection means for selecting one of the plurality of tone correction look-up tables corresponding to the type of medical image information that is input from said medical image information outputting apparatuses.

2. The medical network system of claim 1, wherein:

the image information includes accompanying information that comprises information indicating the type of medical image information; and the selection means selects the tone correction look-up table based on the accompanying information.

3. The medical network system of claim 1, wherein said type of medical image information comprises only said type of medical image information outputting apparatus.

4. The medical network system of claim 3, said type of medical image information outputting apparatus comprising at least one of: a computed radiography apparatus, a computed tomography apparatus, an ultrasonography apparatus a magnetic resonance imaging apparatus, an x-ray photographing apparatus and a resonance imaging apparatus.

5. The medical network system of claim 1, wherein said type of medical image information comprises only said type of photographed body portion.

6. The medical network system of claim 1, wherein said type of medical image outputting apparatus provides the image information by receiving radiation emitted by an object that is exposed to an electromagnetic source having a frequency greater than a frequency of visible light.

7. A medical network system according to claim 1, wherein the tone correcting means for correcting the image information so that the color tone of the visual image becomes a desired tone corresponding to a type of medical image information, the color tone correction being based on only one of: a type of medical image information outputting apparatus and a type of photographed body portion, and for inputting the correct image information to the image display means.

8. The medical network system of claim 1, wherein:
the tone correction means comprises the plurality of tone correction look-up tables for correcting the image information according to said type of medical image information comprising only one of: the type of medical image information outputting apparatus and said photographed body part; and
selection means for selecting one of the plurality of tone correction look-up tables based on only the one type of medical image information.

9. A method of connecting, to a medical network, medical image information apparatuses and an image display apparatus shared for displaying medical image information that is output from the medical image information outputting apparatuses as a visual image in color, comprising:
correcting medical image information to produce a tone-corrected medical image in accordance with a type of medical information that comprises a type of medical image information outputting apparatus and/or a type of photographed body portion; and
inputting said corrected medical image information to the image display apparatus after performing said correcting step so that the tone of the visual image becomes a desired tone corresponding to the type of image information, wherein the step of correcting image information comprise using a plurality of tone correction look-up tables and selecting one of the plurality of tone correction look-up tables corresponding to the type of medical image information that is input from said medical information outputting apparatuses.

10. The method of claim 9, wherein said type of medical image information comprises only said type of medical image information outputting apparatus.

11. The method of claim 10, said type of medical image information outputting apparatus comprising at least one of: a computed radiography apparatus, a computed tomography apparatus, an ultrasonography apparatus a magnetic resonance imaging apparatus, an x-ray photographing apparatus and a resonance imaging apparatus.

12. The method of claim 9, wherein said type of medical image information comprises only said type of photographed body portion.

13. The method of claim 9, wherein said type of medical image outputting apparatuses provide the medical image information by receiving radiation emitted by an object that is exposed to an electromagnetic source having a frequency greater than a frequency of visible light.

14. A method of claim 9, wherein correcting medical image information to produce a tone-corrected medical image is performed in accordance with only one type of medical information selected from: a type of medical image information outputting apparatus and a type of photographed body portion.

15. An output display apparatus operable in a network including a plurality of medical devices each having a code that identifies a type of medical information that comprises a type of medical image information outputting apparatus and/or a type of photographed body portion, said output display apparatus comprising:
a display;
a tone correction look up table setting device operable to set up a plurality of look up tables corresponding to the plurality of medical devices; and
a selector for determining the code corresponding to said type of medical image transmitted by respective ones of said plurality of medical devices, said selector selecting one of said plurality of look up tables for adjusting an image tone based on the code to provide an output that comprises a tone-adjusted image to said display, and for further determining a second code from each of said plurality of medical devices, said second code corresponding to at least one of a model and a production number of said plurality of medical devices, said selector selecting one of said plurality of look up tables with reference to said second code.

16. The output display apparatus of claim 15, wherein said tone-adjusted image is displayed on said display in color.

17. The apparatus of claim 15, wherein said type of medical image information comprises only said type of medical image information outputting apparatus.

18. The apparatus of claim 16, said type of medical image information outputting apparatus comprising at least one of: a computed radiography apparatus, a computed tomography apparatus, an ultrasonography apparatus a magnetic resonance imaging apparatus, an x-ray photographing apparatus and a resonance imaging apparatus.

19. The apparatus of claim 15, wherein said type of medical image information comprises only said type of photographed body portion.

20. The apparatus of claim 15, wherein said type of medical image outputting apparatus provides information by receiving radiation emitted by an object that is exposed to an electromagnetic source having a frequency greater than a frequency of visible light.

21. An output display apparatus according to claim 15, wherein said selector selects one of said plurality of look up tables according to only one of: a type of medical image information outputting apparatus and type of photographed body portion.

22. A medical network system, wherein medical image information outputting apparatuses which output gray-scale image information and an image display apparatus shared for displaying image information output from the medical image information outputting apparatus which output gray-scale image information as visual images are networked, and wherein the medical image information outputting apparatuses which output gray-scale image information include respective output screens, the image display apparatus comprising:
image display means for displaying the visual image in color; and
a color correcting means for correcting the image information so that a color tone of the visual image becomes a desired tone corresponding to a type of medical image information that comprises at least one of: a type of medical image information outputting apparatus which output gray-scale image information and a type of photographed body portion, and for inputting the correct image information to the image display means; said color correcting means comprising a plurality of tone correction look-up tables and selection means for selecting one of the plurality of tone correction look-up tables corresponding to the type of medical image information that is input from said medical image information outputting apparatuses.

23. A method of connecting, to a medical network, medical image information outputting apparatuses which output gray-scale image information and an image display apparatus shared for displaying medical image information that is output from the medical image information outputting apparatuses as a visual image in color, wherein the medical image information outputting apparatuses which output gray-scale image information include respective output screens, said method comprising:

correcting medical image information to produce a color tone-corrected medical image in accordance with a type of medical information that comprises at least one of: a type of medical image information outputting apparatus which output gray-scale image information and a type of photographed body portion; and inputting said corrected medical image information to the image display apparatus after performing said correcting step so that the color tone of the visual image becomes a desired tone corresponding to the type of image information, wherein the color tone of the visual image on the image display apparatus matches a color tone of an output screen of a corresponding medical image information outputting apparatus, wherein the step of correcting medical image information comprises using a plurality of tone correction look-up tables and selecting one of the plurality of tone correction look-up tables corresponding to the type of medical image information that is input from said medical image information outputting apparatuses.

24. An output display apparatus operable in a network including a plurality of medical devices each having a code that identifies a type of medical information that comprises at least one of: a type of medical image information outputting apparatus which output gray-scale image information and a type of photographed body portion, and said plurality of medical devices having a respective output screens, said output display apparatus comprising:

a display;

a color tone correction look up table setting device operable to set up a plurality of look up tables corresponding to the plurality of medical devices; and a selector for determining the code corresponding to said type of medical image transmitted by respective ones of said plurality of medical devices, said selector selecting one of said plurality of look up tables for adjusting an image tone based on the code to provide an output that comprises a color tone-adjusted image to said display, where said display outputs an image having a color tone which matches a color tone of a corresponding output screen of one of the plurality of medical devices, based on the code.

* * * * *